US008009554B2

(12) United States Patent
Chin et al.

(10) Patent No.: US 8,009,554 B2
(45) Date of Patent: Aug. 30, 2011

(54) METHOD FOR MULTIPLE LINK QUALITY OF SERVICE FOR VOICE AND VIDEO OVER INTERNET PROTOCOL

(75) Inventors: Bill Chin, San Jose, CA (US); Sajit Bhaskaran, Sunnyvale, CA (US); Robin Mavunkel, Sunnyvale, CA (US)

(73) Assignee: Aspen Networks, Inc., Santa Clara, CA (US)

( * ) Notice: Subject to any disclaimer, the term of this patent is extended or adjusted under 35 U.S.C. 154(b) by 172 days.

(21) Appl. No.: 12/137,258

(22) Filed: Jun. 11, 2008

(65) Prior Publication Data

US 2009/0279436 A1 Nov. 12, 2009

Related U.S. Application Data

(60) Provisional application No. 61/036,377, filed on Mar. 13, 2008.

(51) Int. Cl.
*G01R 31/08* (2006.01)
(52) U.S. Cl. ...................................... 370/216
(58) Field of Classification Search ................... 370/216
See application file for complete search history.

(56) References Cited

U.S. PATENT DOCUMENTS

| | | | | |
|---|---|---|---|---|
| 2003/0156559 | A1* | 8/2003 | Yi et al. | 370/331 |
| 2006/0193295 | A1* | 8/2006 | White et al. | 370/336 |
| 2007/0253413 | A1* | 11/2007 | Citron et al. | 370/389 |
| 2008/0130574 | A1* | 6/2008 | Nam et al. | 370/331 |

OTHER PUBLICATIONS

Can You Hear Me Now?!; It Must Be BGP; Nate Kushman; Srikanth Kandula; Dina Katabi; 6-pages.
draft-rosenberg-sip-entfw-02.txt; Internet Engineering Task Force; SIP WG; Internet Draft; Jonathan Rosenberg Joel Weinberger, Henning Schulzrinne; dynamicsoft, Columbia U.; Jul. 20, 2001; Expires: Feb. 2002; NAT Friendly SIP; 29-pages.
draft-rosenberg-sipping-NAT-scenarios-00.txt; Internet Engineering Task Force; Sipping WG; Internet Draft; Jonathan Rosenberg; Rohan Mahy, Sanjoy Sen; dynamicsoft, Cisco, Nortel; Nov. 14, 2001; Expires: Mar. 2002; NAT and Firewall Scenarios and Solutions for SIP; 57-pages; Internet Draft; NAT scenarios; Nov. 16, 2001.
Port address translation; From Wikipedia, the free encyclopedia.

(Continued)

*Primary Examiner* — Kevin C Harper
(74) *Attorney, Agent, or Firm* — Orrick Herrington & Sutcliffe, LLP

(57) ABSTRACT

A method for achieving multiple link quality of service for video and voice calls over Internet links, or over IP links running in private networks, is described. This method applies to both the non-mobile domain (alternate paths exist in one place at the same time) as well as the mobile domain (one path is used at any one place at a given time, but the user device roams from place to place). This method can be implemented as either computer software or other digital logic (ASIC or FPGA). Using this invention, voice and video calls can be moved at will from one path to another, as many times as required during a single conversation, without breaking the RTP voice or video payload stream. The benefit is that embodiments of this invention have a significantly higher probability that a call never breaks under various conditions of quality degrade. This includes the case of link and router failures, which are treated as a special case of quality degrade in the context of voice and video.

28 Claims, 13 Drawing Sheets

OTHER PUBLICATIONS

Network Working Group; Request for Comments: 1631; Category: Informational; Cray Communications; Kjeld Borch Egevang and Paul Francis; NTT; May 1994; the IP Network Address Translator (NAT); 10-pages.

Network Working Group; Request for Comments: 1771; Yakov Rekhter, T.J. Watson Research Center IBM Corp.; Obsoletes: 1654; Tony Li, cisco Systems, Inc., Editors; Category: Standards Track;A Border Gateway Protocol 4 (BGP-4); Mar. 1995; 57-pages; document was originally published as RFC 1267 in Oct. 1991, jointly authored by Kirk Lougheed (cisco Systems) and Yakov Rekhter (IBM).

Network Working Group; Request for Comments: 1889; Category: Standards Track; RTP: A Transport Protocol for Real-Time Applications; Audio-Video Transport Working Group; Henning Schulzrinne, GMD Fokus; Stephen L. Casner, Precept Software, Inc.; Ron Frederick, Xerox Palo Alto Research Center, Van Jacobson, Lawrence Berkeley National Laboratory; Jan. 1996; 75-pages.

Network Working Group; Request for Comments: 2131; Obsoletes: 1541; Category: Standards Track; Dynamic Host Configuration Protocol; Ralph Droms; Bucknell University; Mar. 1997; 45-pages.

Network Working Group; Request for Comments: 2327; Category: Standards Track; SDP: Session Description Protocol; Mark Handley and Van Jacobson; ISI/LBNL; Apr. 1998; 42-pages.

Network Working Group; Request for Comments: 2516; Category: Informational; A Method for Transmitting PPP Over Ethernet (PPPoE); Louis Mamakos, Kurt Lidl and Jeff Evarts, Uunet Technologies, Inc.; David Carrel and Dan Simone, RedBack Networks, Inc.; Ross Wheeler; RouterWare, Inc.; Feb. 1999; 17 pages.

Network Working Group; Request for Comments: 3261; Obsoletes: 2543; Category: Standards Track; SIP: Session Initiation Protocol; Jonathan Rosenberg, dynamicsoft; Henning Schulzrinne, Columbia University; Gonzalo Camarillo, Ericsson; Alan Johnston, WorldCom; Jon Peterson, NeuStar; Robert Sparks, dynamicsoft; Mark Handley, ICIR; Eve Schooler, AT&T; Jun. 2002; 269-pages.

* cited by examiner

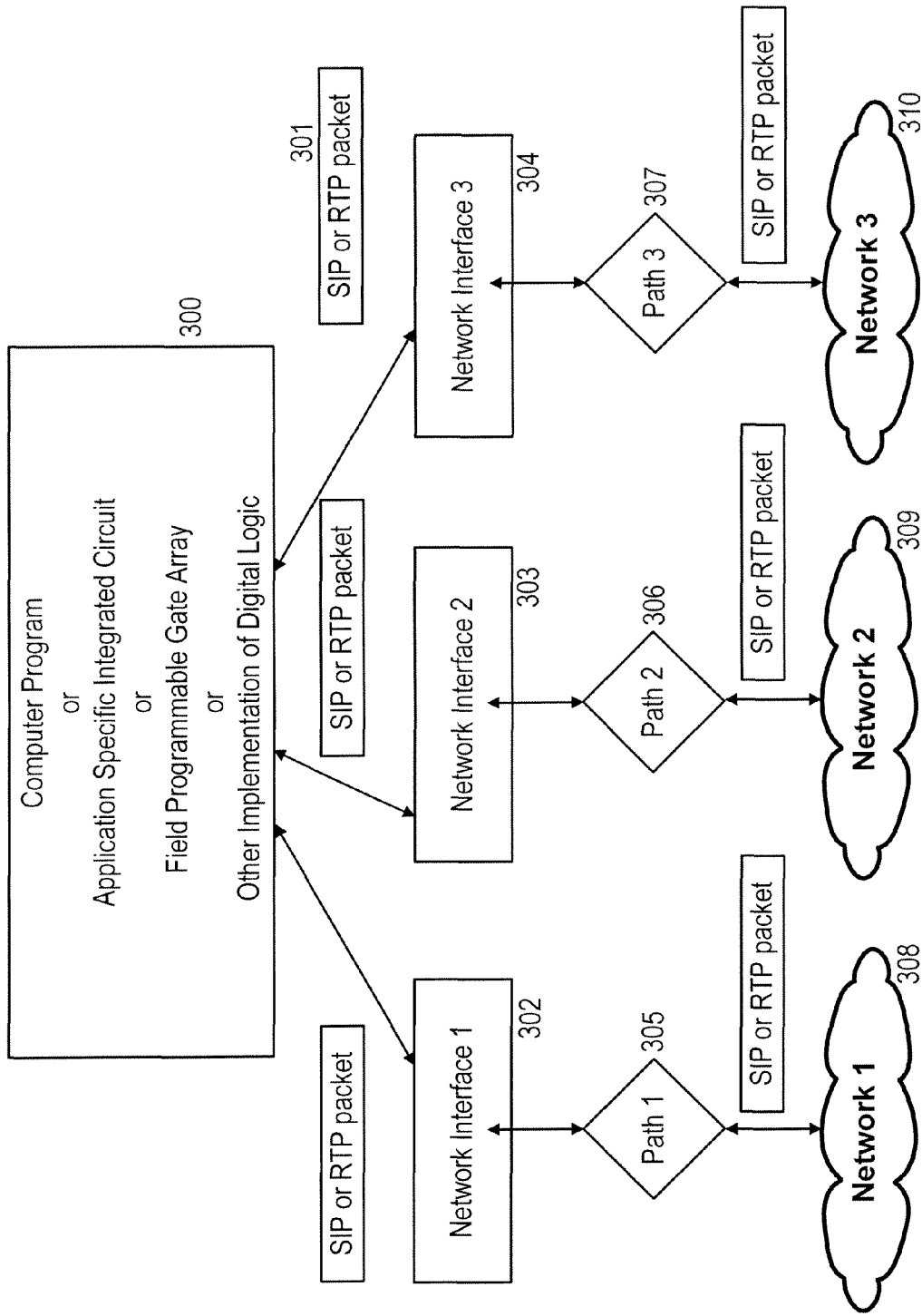
Fig 1 Generic Embodiment of Invention

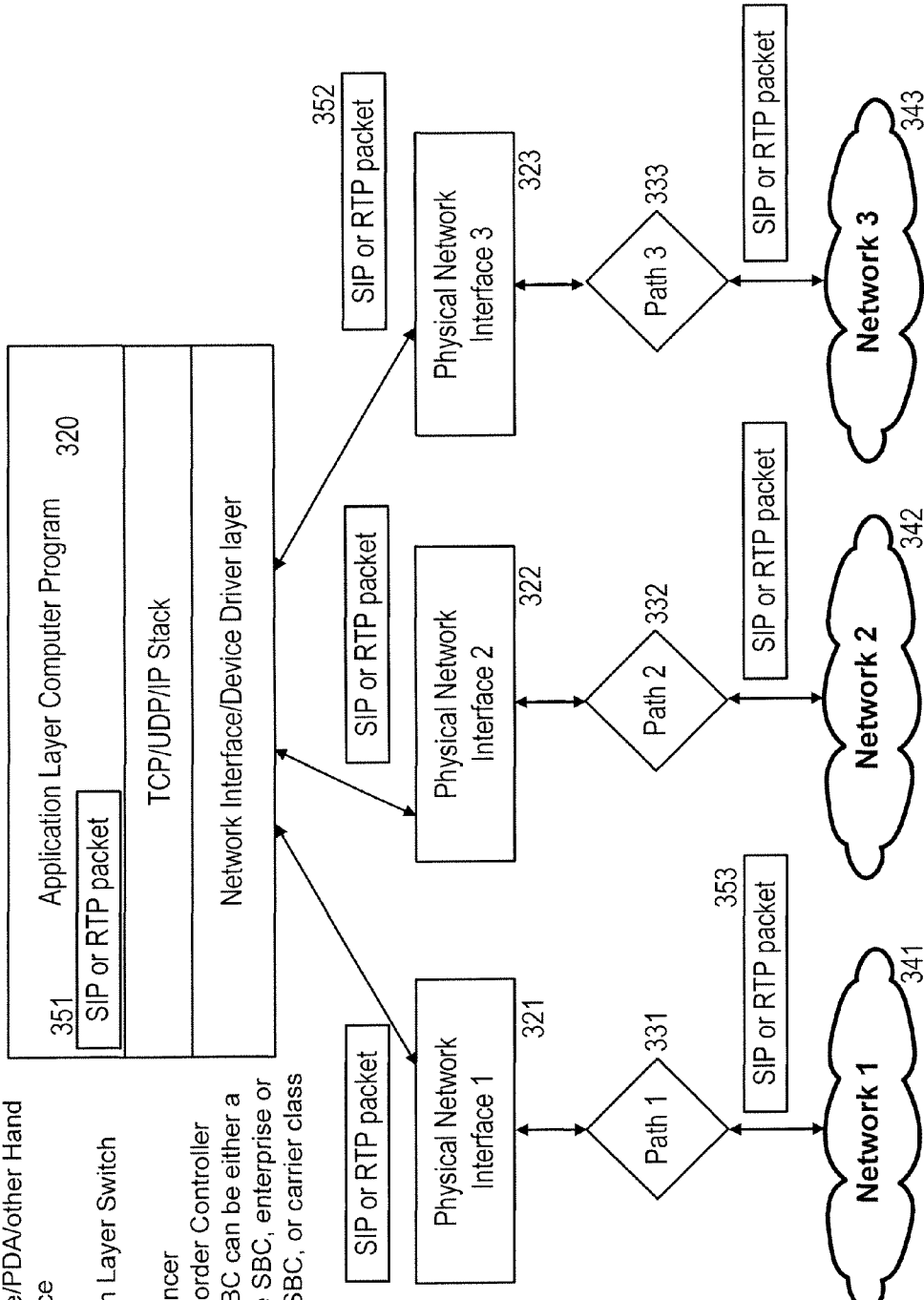

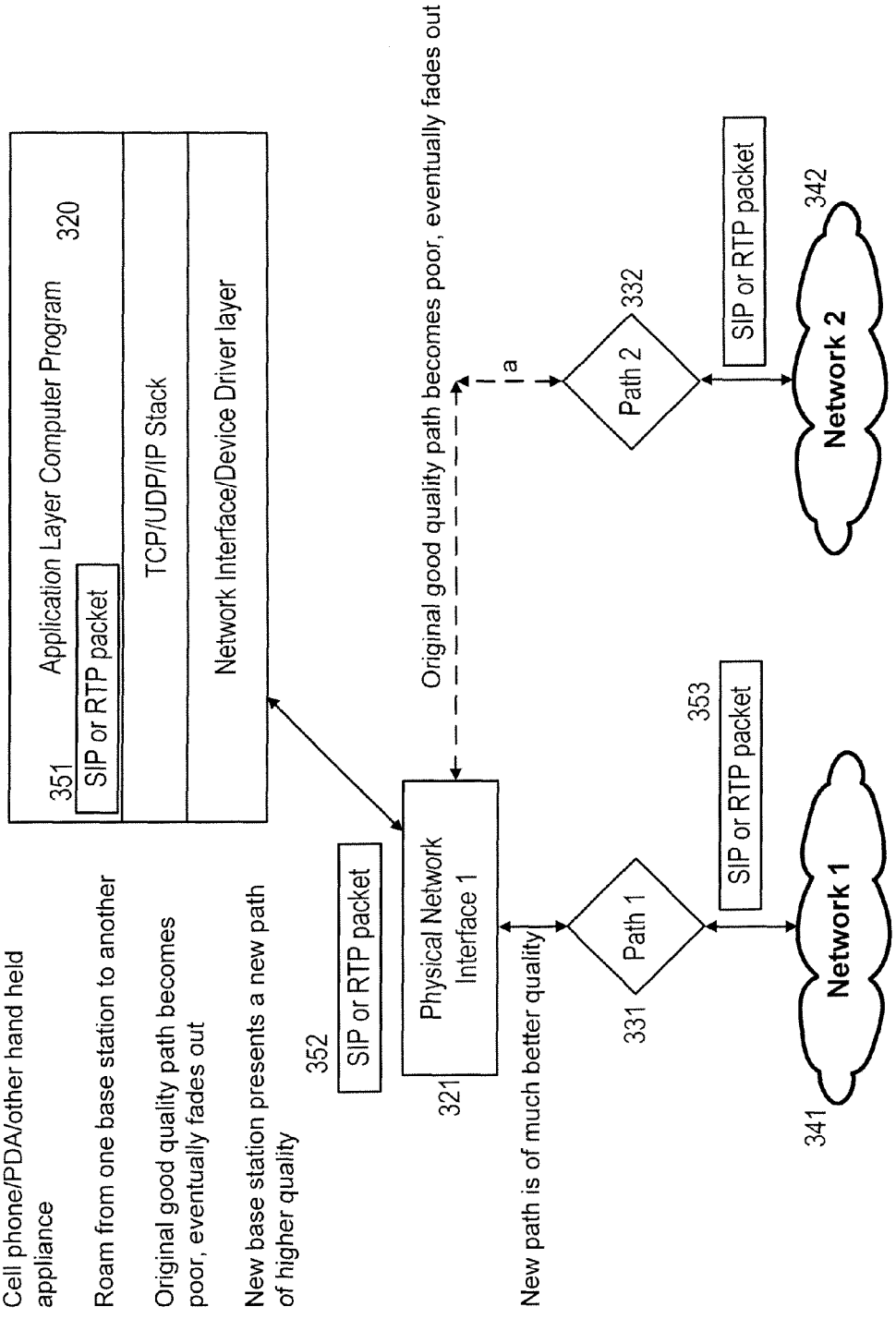

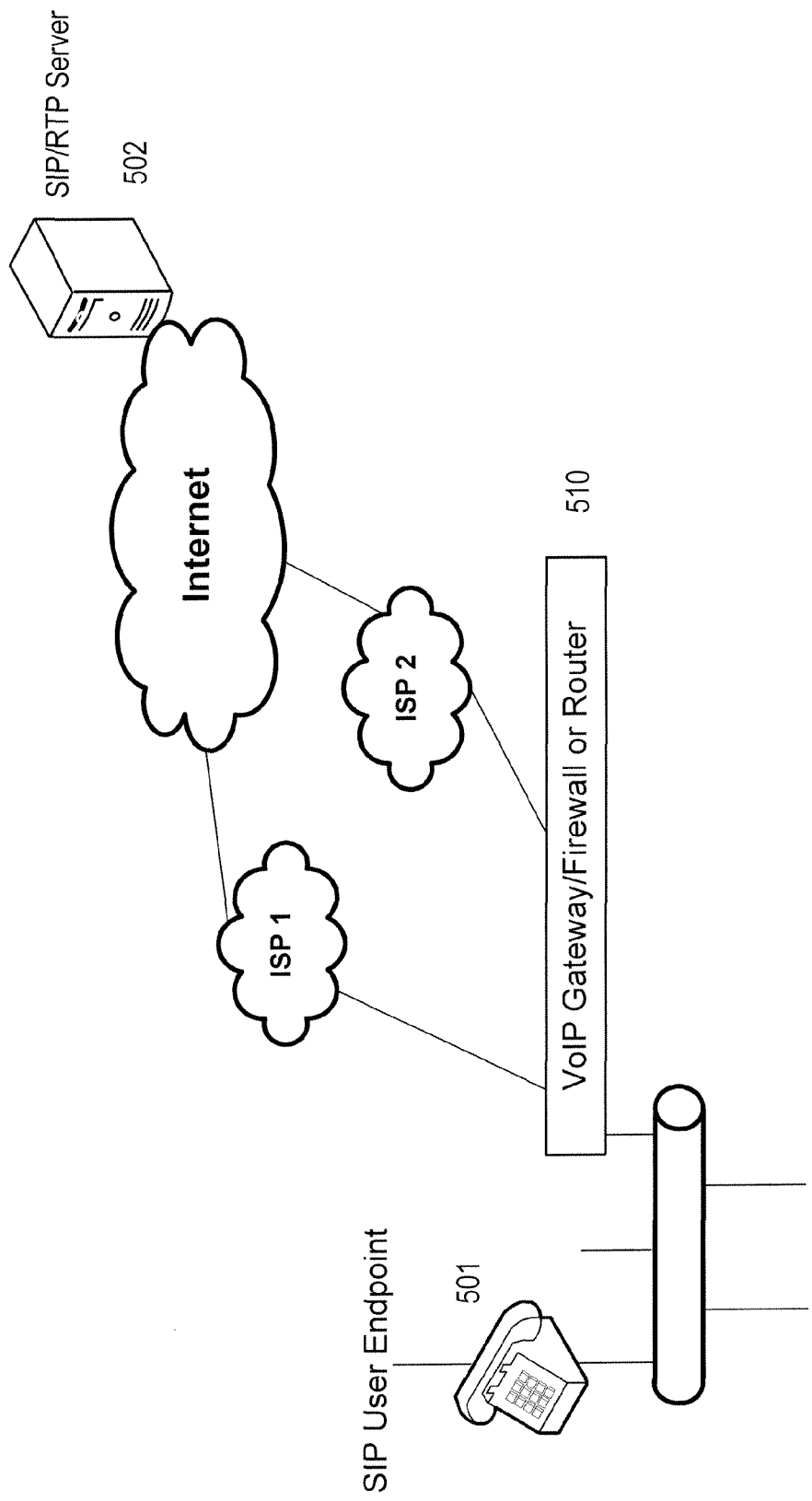
Fig 3 Typical SIP User Endpoint Connection to a SIP Server

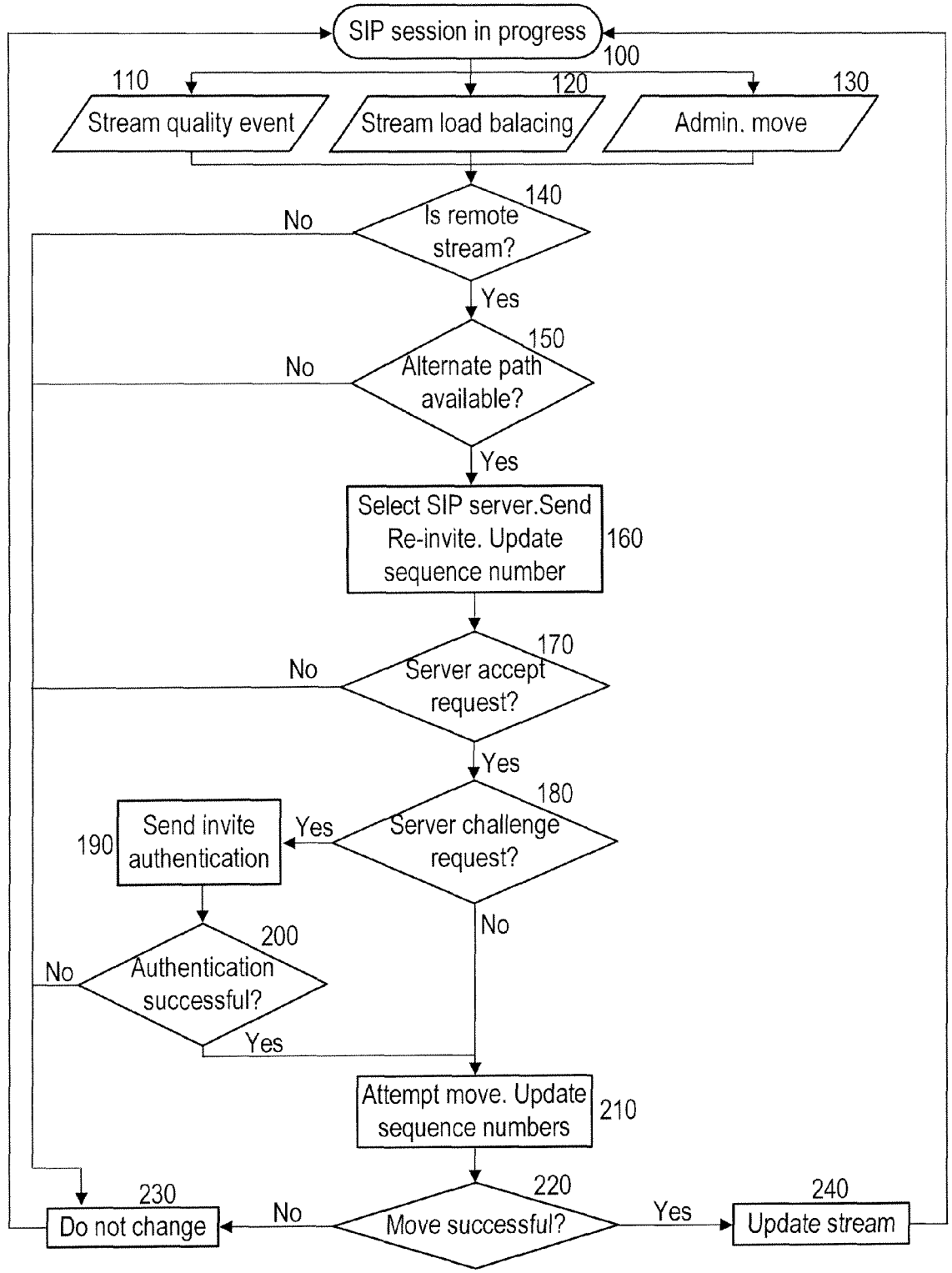
Fig 4   Move SIP Control Flow and RTP Stream. The Flow Chart

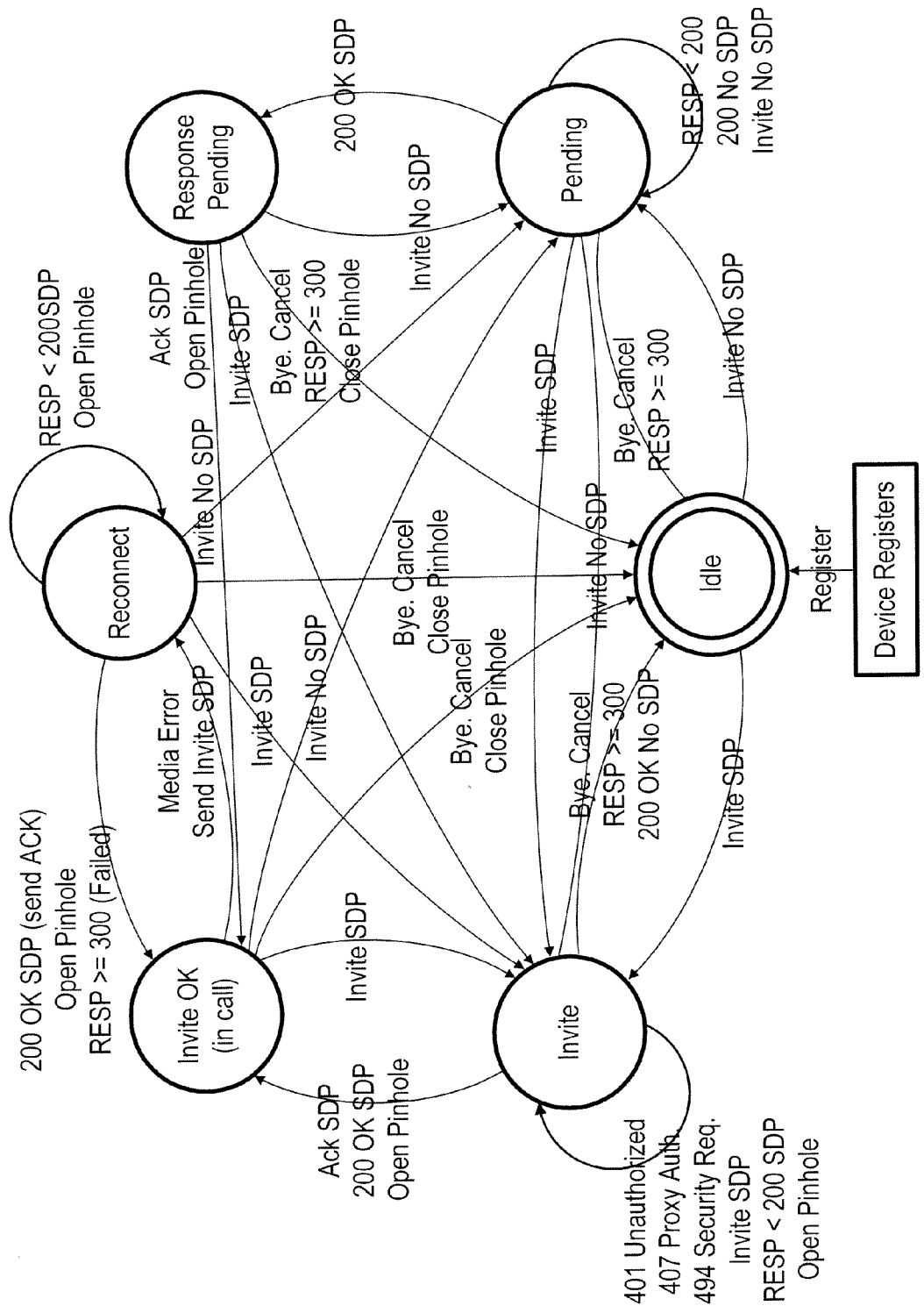
Fig 5  SIP Transaction State Machine

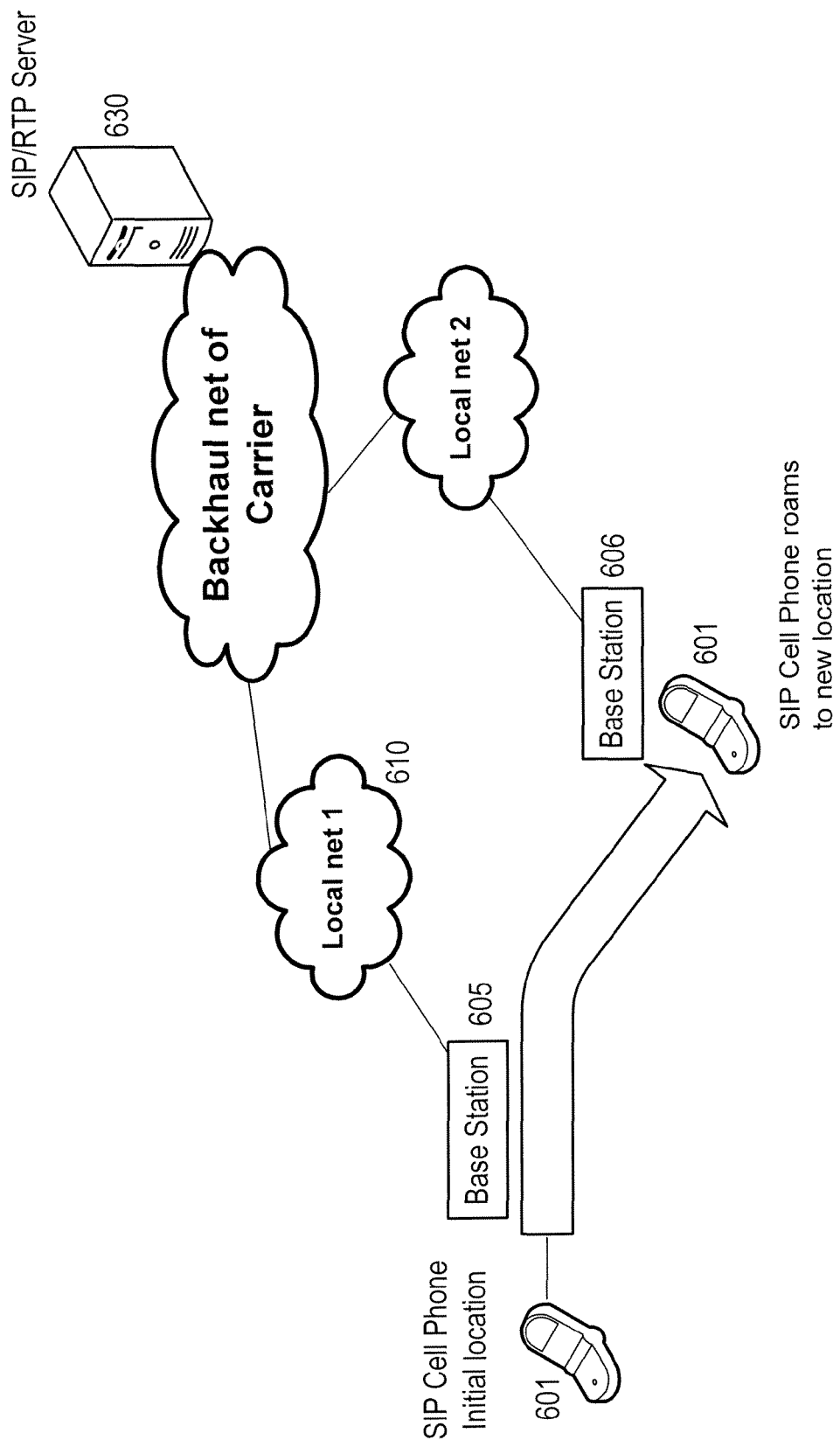
Fig 6  Typical SIP Cell Phone Roaming Embodiment

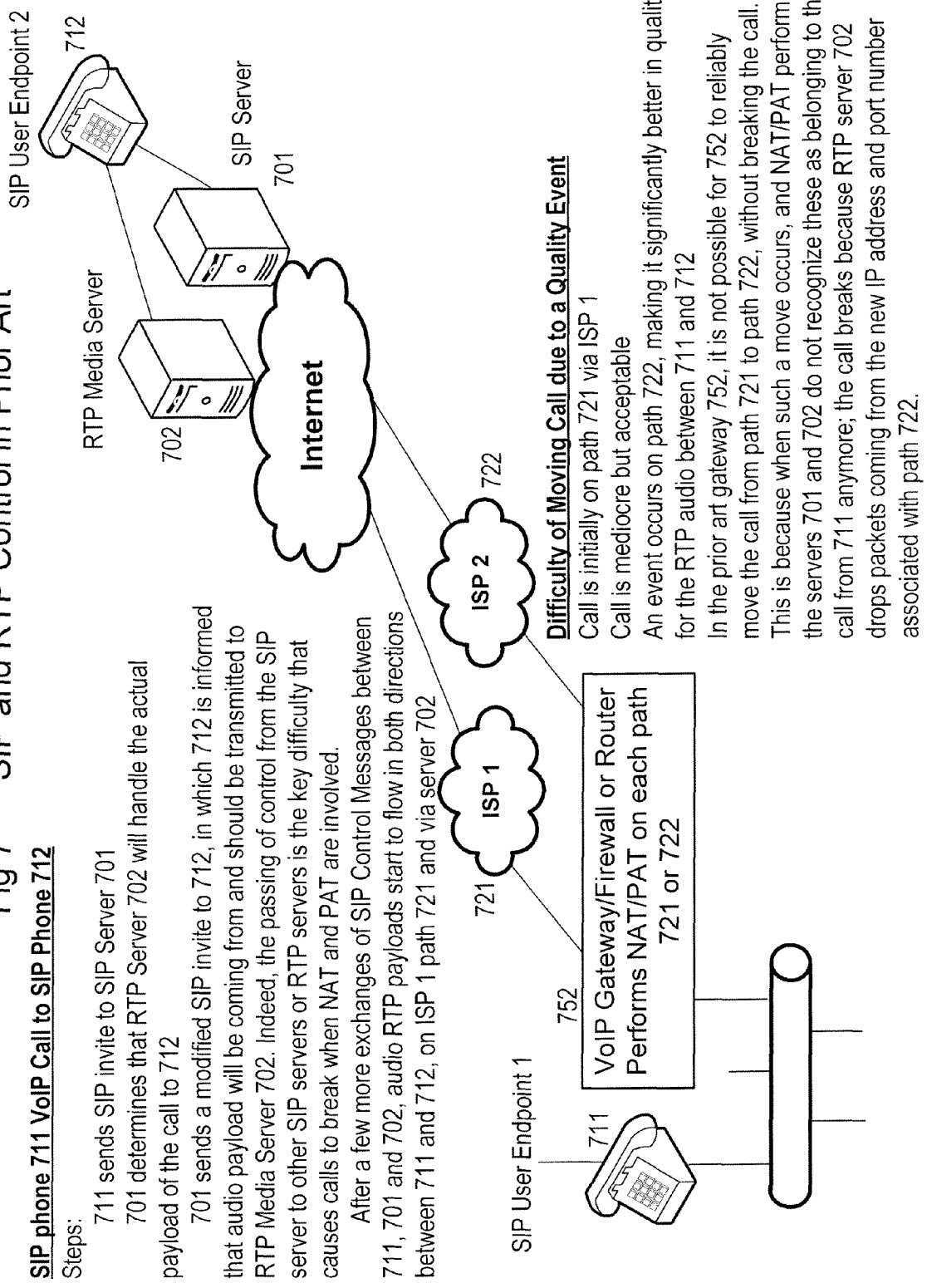

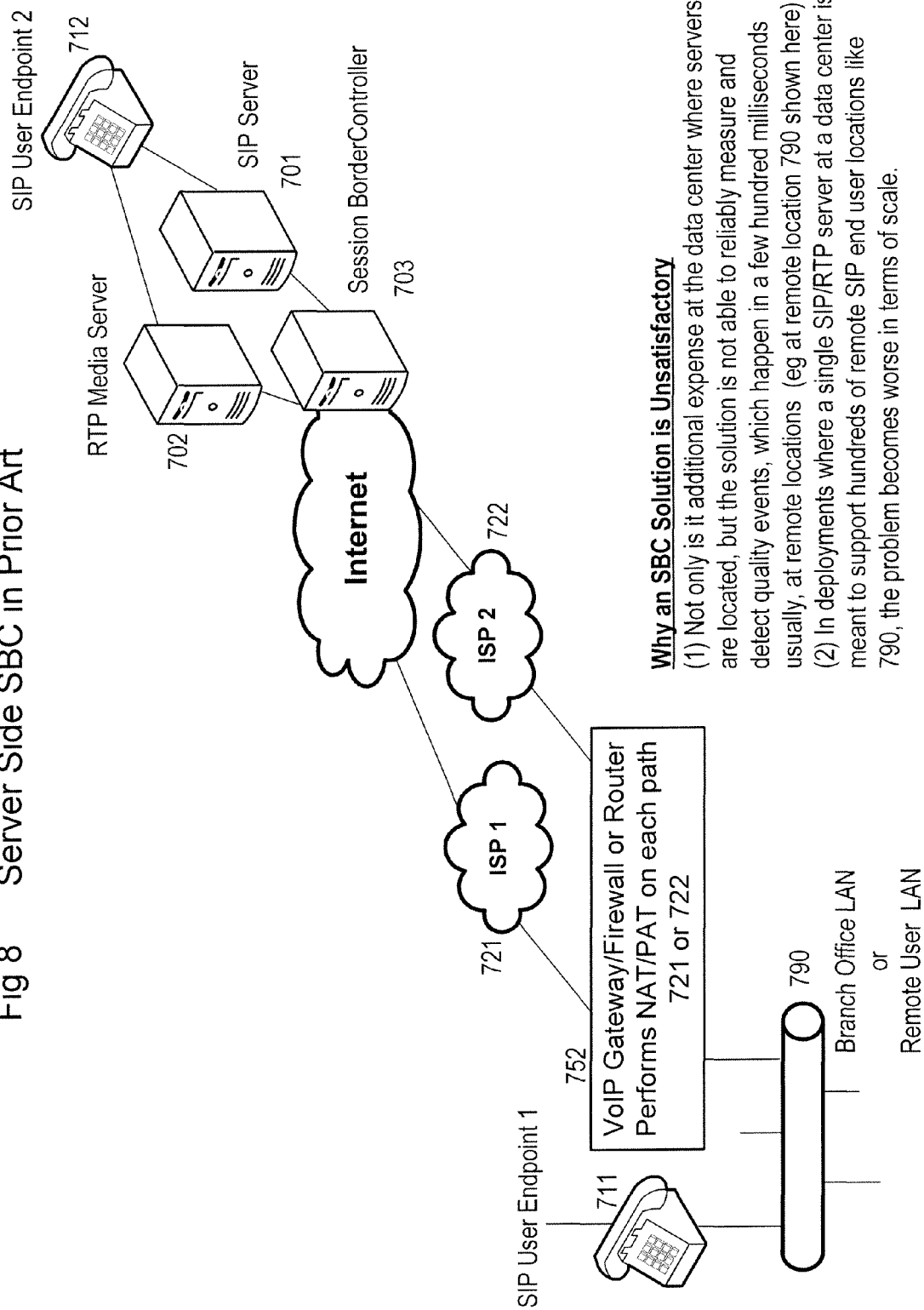
Fig 8  Server Side SBC in Prior Art

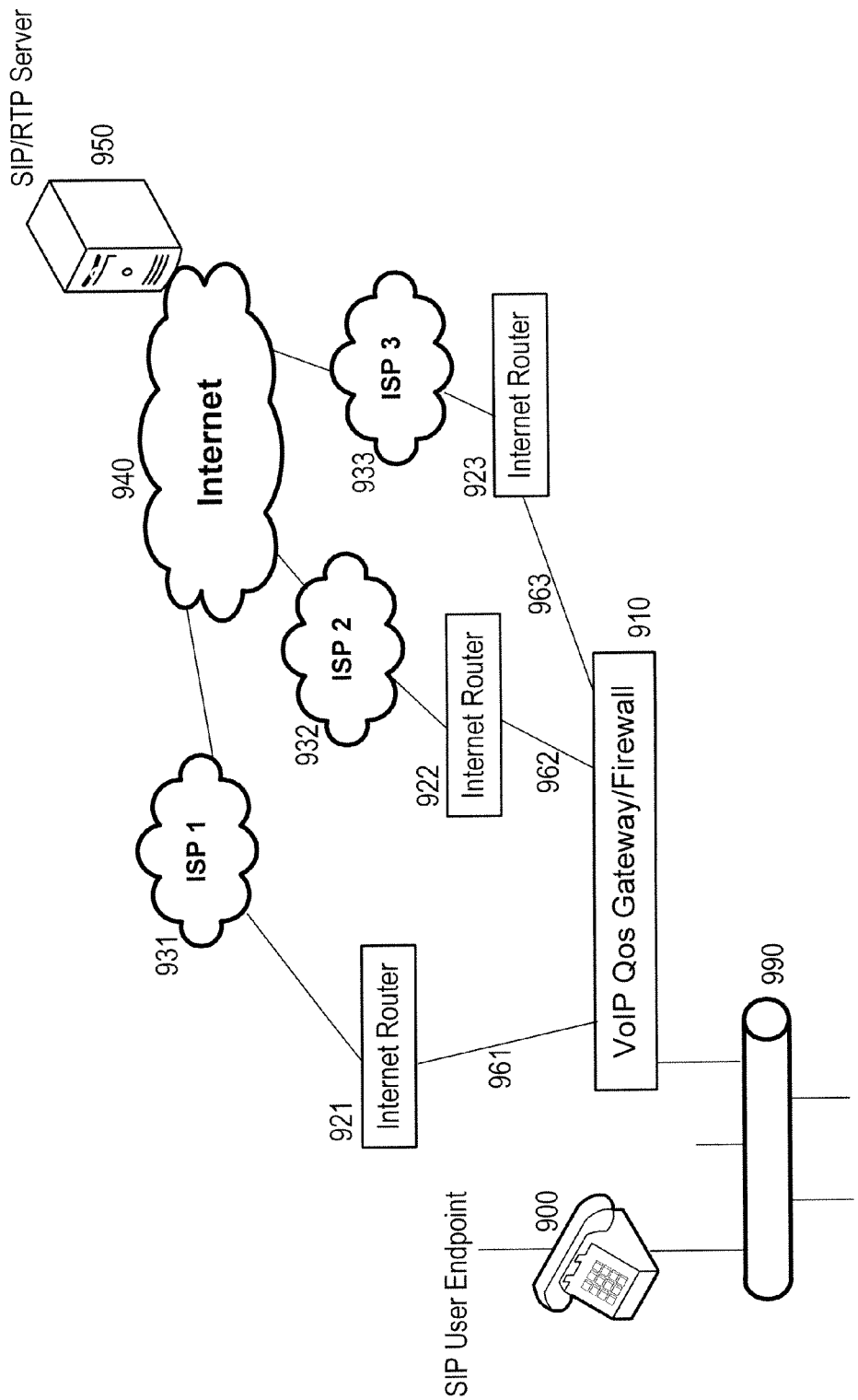
Fig 9 A QoS Gateway Embodiment of Invention

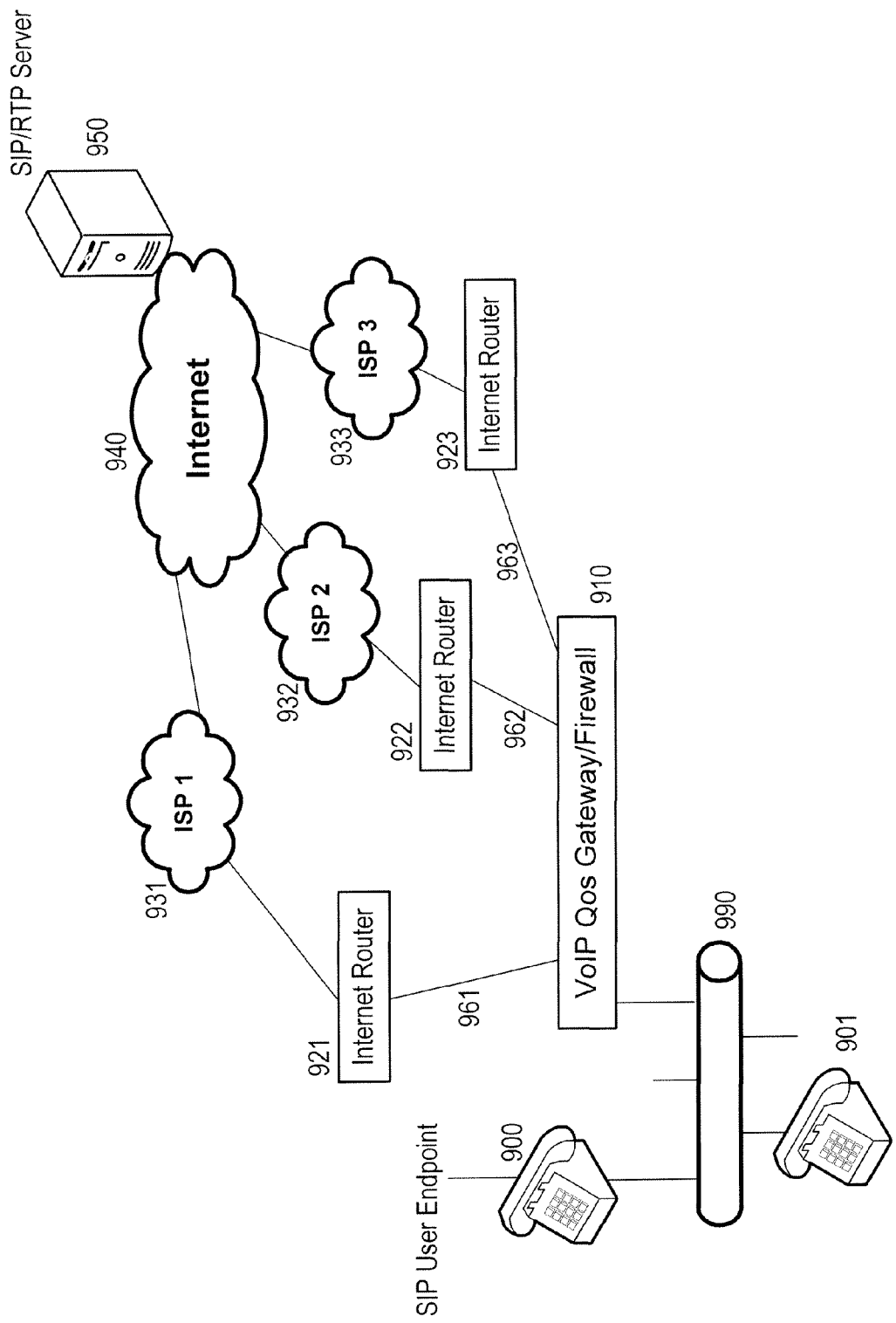
Fig 10 -- A QoS Gateway Embodiment -- Stream Load Balancing

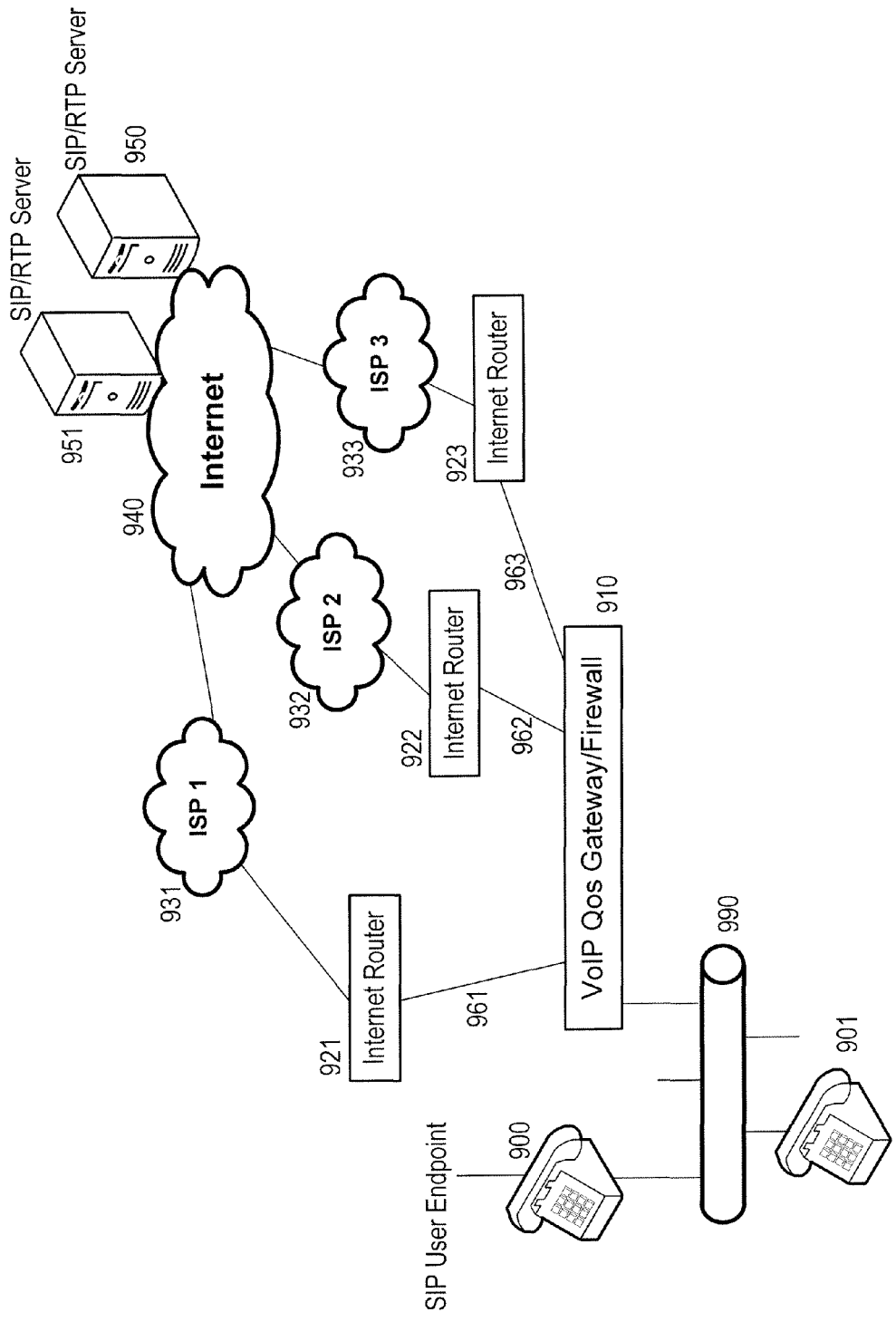
Fig 11 -- A QoS Gateway Embodiment with multiple SIP Servers (dual registrations)

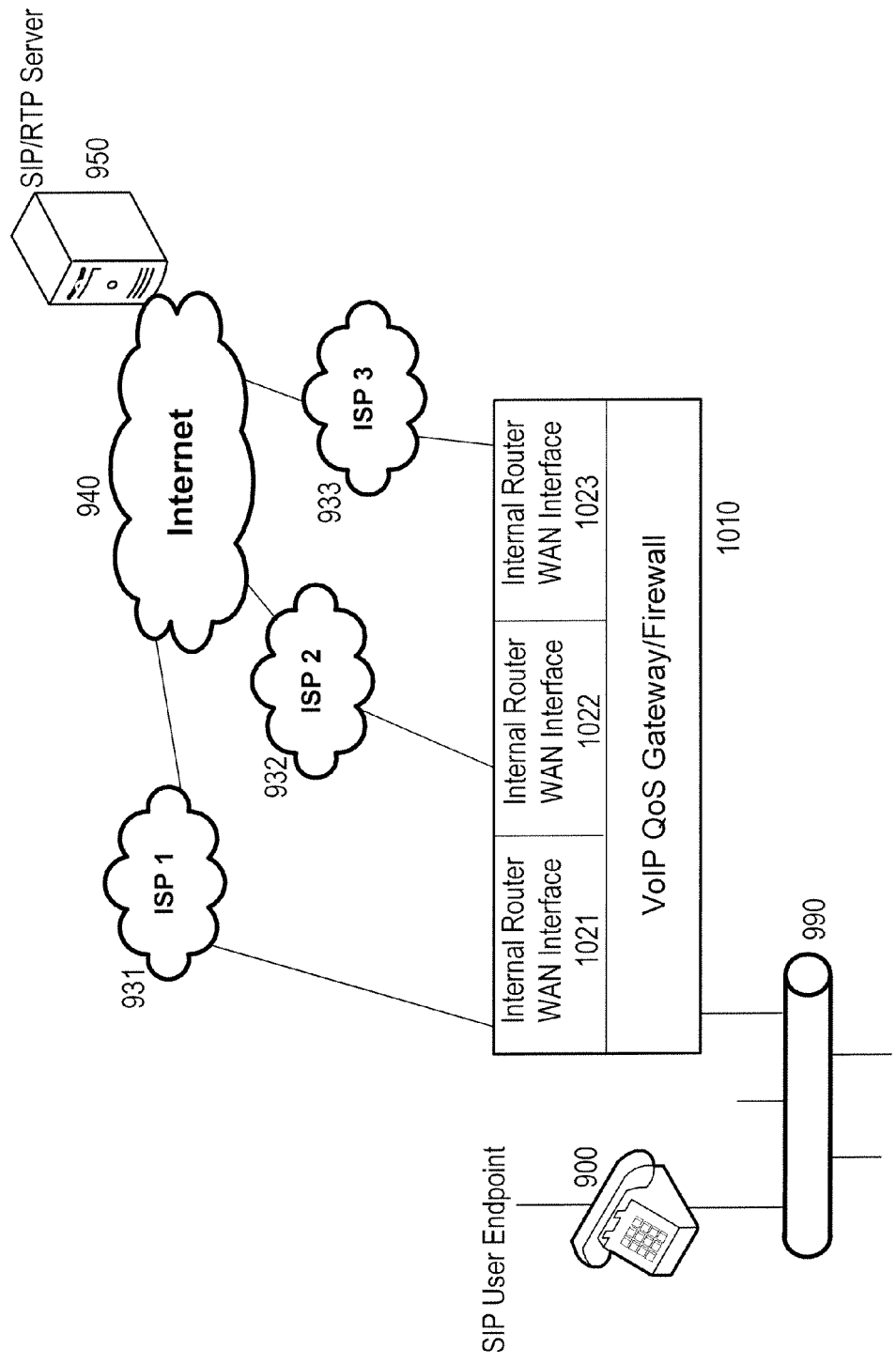
Fig 12 QoS Gateway Embodiment with Internal Router WAN Interface Modules

METHOD FOR MULTIPLE LINK QUALITY OF SERVICE FOR VOICE AND VIDEO OVER INTERNET PROTOCOL

The present application claims the benefit of and priority to U.S. Provisional Patent Application No. 61/036,377 filed on Mar. 13, 2008, which is hereby incorporated by reference in its entirety.

The invention described applies to computer and telecommunications networks, where software or other digital logic such as FPGAs, ASICs are used in the control and transmission of video or audio payloads over networks using the Internet Protocol (IP). Embodiments could be in networked computers, cell phones, routers, switches, firewalls, gateways, session border controllers, and miscellaneous networking devices connecting to both wireless and wired networks. The invention applies equally to transmission over private network links and paths, or over the public Internet.

The main standard protocols in use for audio and video over IP networks are the Session Initiation Protocol (SIP), Session Description Protocol (SDP) as defined in [1], [2] respectively, and lastly the Real Time Protocol (RTP) and RTP Control Protocol (RTCP) as defined in [3]. These are the standard protocols in use with Voice over Internet Protocol (VoIP), as well as in various video and video-conferencing protocol stacks that run on top of IP. Practitioners of ordinary skill in the art will also be familiar with computers, routers, firewalls, VoIP gateways, VoIP session border controllers, video session border controllers, and other networked devices that implement Network Address Translation (NAT) as described in [5]. A variant of NAT is Port Address Translation (PAT) where many devices can share a single public IP address; the technique involves careful use of TCP and UDP port numbers. More information about PAT can be found in [9]. NAT and PAT are important because of the necessity of security and quality-of-service gateway devices, as well as other devices operating at the Application Layer of the TCP/IP reference model; these are often deployed at a user's premises when connecting to the Internet or private network operators. The necessity and demand by users that voice and video over Internet be able to successfully interoperate with these application gateway devices is well established.

Practitioners of ordinary skill in the art may also be familiar with Internet routing protocols, such as BGP as defined in [4]. Studies have shown recently that BGP networks are susceptible to numerous short-lived instabilities that adversely affect audio and video streams transported over the Internet; VoIP calls in particular are adversely affected by various Internet instabilities related to BGP [6]. Video or audio calls that are in progress tend to break when these instabilities occur, as extensively documented in [6].

SIP/SDP and RTP have proven to be extremely difficult to operate in networks involving NAT and PAT, as explained in [7], [8]. For example, many security firewalls implement NAT/PAT. More often than not, audio and video traffic using SIP/SDP and RTP tend to break when firewall methods (or other software methods involving NAT or PAT) are encountered in the processing path of these same SIP/SDP and RTP traffic.

A number of prior art "gateway" devices exist for video and audio over IP traffic. These usually provide a security firewall function. More significantly, they frequently offer a quality of service (QOS) feature. In this case, the wide area network (WAN) link is typically a bottleneck where voice and video traffic may compete for scarce bandwidth with data traffic (such as file transfers). Such gateways often are advertised as performing QOS enforcement by traffic shaping or rate limiting or rate policing, on the single WAN link. Voice and video traffic are often given better treatment by limiting the amount of bandwidth consumed by normal data traffic (such as PC file transfers).

The field of the invention also relates to both mobile and non-mobile domains in voice and video communications.

In the prior art, no technology exists whereby with multiple links or paths available in a mobile or non-mobile domain, where these alternate paths are combined intelligently to provide the best quality of service for VoIP or Video over IP.

Example in the non-mobile domain: if an Internet voice call is originating in a device (computer or gateway or other embodiment) and multiple WAN links are available concurrently, each representing a different Internet path, there is no prior art that solves the problem of determining the "best" link at any given time, where "best" is defined as the link or path that provides the best quality. Voice or video quality over a given path is often determined by various metrics, such as packet loss, jitter, packet re-sequencing, packet duplicate creation, MOS scores, etc. In the prior art, if an established VoIP call is in progress, and a quality of service degrade event occurs in the middle of a call (such as packet loss, link failure, increased jitter etc.), the speakers usually lose the call in the middle of their conversation.

Not all quality events are degrade events on an active link. Example: A quality of service event could also occur on a network link which is not currently in use; in this case voice or video traffic is currently being placed on some link other than the one on which the event occurred. If the inactive link suddenly becomes of significantly higher quality than the active one, it may be desirable to move the voice or video payload (in reality an RTP flow) from the currently active link, to the better-quality link. What is lacking in the prior art is the ability to move the call "at will" and with full confidence that the call will not break; it usually does break because of the traditional difficulty of handling NAT and PAT in the presence of SIP and RTP protocols. This is depicted in FIG. 7.

It is important to understand that in the prior art, dynamic IP routing protocols (such as BGP, OSPF, IS-IS and others) do not solve the non-mobile domain problem—how to pick the best path among several concurrent ones—so that quality never degrades. For example, if there is a 5-second interval where packet loss is high—it may be 10% packet loss, which is known to cause severe degradation for voice—these dynamic routing protocols do not make any path change to correct the problem. Five seconds of unacceptable voice quality is enough to make the speakers hang up the phone.

Since the prior art routers have difficulty dealing with these issues, it has become clear to practitioners of ordinary skill in the art that voice and video quality control needs to be asserted—in terms of auto-detection of quality degrades and consequent actions to recover quality—in devices other than routers—more specifically in various types of application layer devices, including possibly the voice and video endpoints. Examples of such application layer devices are VoIP or video gateways/firewalls, QOS gateways, SIP phones, cell phones which are SIP/RTP enabled, and videoconferencing terminals.

Unfortunately, prior art gateways have problems when multiple WAN or Internet links need to be treated as alternate paths. As mentioned earlier, in the prior art, when a voice or video call is moved, a NAT or PAT often has to be performed. In the general case of a SIP/RTP user endpoint (such as an Internet phone, videoconference station, IP TV receiver—see 501 in FIG. 3) communicating with a SIPIRTP server—depicted as 502 in FIG. 3 (in the case of voice, this SIP server is often called an IP PBX)—it is often found that moving a call from one path to another path to get a better call quality results in the call itself breaking. Sometimes, additional devices called Session Border Controllers (SBC) are inserted in front of the SIP server at an Internet data center to try and fix this problem. Unfortunately—the cost of additional SBC equipment at the data center is an unnecessary economic burden; not to mention these SBCs are not able to detect quality degrades at remote locations and auto-correct for them when alternate paths do exist. The SBC in some deployment scenarios is not even aware of the existence and identity, as expressed in source IP address ranges, of these alternate Internet or WAN paths. An SBC deployment example is shown in FIG. 8. If FIG. 8 were applied to the example of hosted IP PBX service, a service provider manages the SBC 703, but the customer manages the WAN links (paths) 721 and 722 shown in FIG. 8, without the service provider or the SBC being aware of these. Hence the prior art SBC is an unsatisfactory and inadequate solution for achieving and maximizing quality of service when multiple links are available across the remote network.

Because of the expense and other issues of deploying SBCs, many customers are attempting to deploy voice or video with multiple WAN links, as shown in FIG. 3. A gateway 501 is installed at customer premises to provide security and quality of service—these are 2 essential functions in most networks. In FIG. 3 today, with a prior art gateway, calls do break when the gateway attempts to move calls from one path to another.

In addition to the non-mobile domain where multiple link choices exist, prior art also does not work well in the mobile domain sense in networks where SIP, RTP and IP are used. This is where different IP paths can be selected at different points in time. A good example is cell phone roaming and handoff from one base station to another base station: in many instances the calls do break when the handoff occurs.

SUMMARY OF INVENTION

A method for achieving multiple link quality of service for video and voice calls over Internet links, or over IP links running in private networks, is described. This method applies to both the non-mobile domain (alternate paths exist in one place at the same time) as well as the mobile domain (one path is used at any one place at a given time, but the user device roams from place to place). This method can be implemented as either computer software or other digital logic (ASIC or FPGA). Using this invention, voice and video calls can be moved at will from one path to another, as many times as required during a single conversation, without breaking the RTP voice or video payload stream. The benefit is that embodiments of this invention have a significantly higher probability that a call never breaks under various conditions of quality degrade. This includes the case of link and router failures, which are treated as a special case of quality degrade in the context of voice and video.

In one embodiment (a non-mobile domain example) a gateway with multiple links to the Internet delivers maximum quality of service to SIP capable phones installed behind it, as in FIG. 3.

In another embodiment (a mobile domain example), a cell phone with a SIP/RTP over IP stack roams from one base station to another, where each base station also implies a different IP default router for the cell phone, as in FIG. 6. In this case, again any call quality degrade or call break event is avoided or minimized by using the methods described in the invention.

DETAILED DESCRIPTION OF INVENTION

Brief Description of the Drawings

FIG. 1, FIG. 2, FIG. 2b, FIG. 3 and FIG. 6 depict some but not all embodiments of the invention.

FIG. 4 is a flow chart of the method for achieving quality of service for voice and video over IP, using multiple links in either a non-mobile domain or mobile domain. Each step in the flow chart is explained in a table below.

FIG. 5 is a Finite State Machine that describes how to implement the invention in digital logic or software in the exemplary embodiment. Other methods of implementation will be understood by practitioners in the art.

DETAILED DESCRIPTION

As mentioned, those of ordinary skill in the art can use either the FSM in FIG. 5, or the Flow Chart in FIG. 4, in order to implement the methods in the embodiments described herein.

In this section we focus on clarifying the flow chart in FIG. 4 with a more detailed description of the methods involved, as well as providing additional clarification for those of ordinary skill in the art.

The Table below begins by giving a description of each of the blocks depicted in FIG. 4 100, 110, 120, 130, 140, 150, 160, 170, 180, 190, 200, 210, 220, 230 and 240.

| Flow Chart Description | | |
|---|---|---|
| Number | Brief Description | A More Detailed Description |
| 100 | SIP session in progress | A SIP session has been established with at least one RTP stream is active. |
| 110 | Stream quality event | These events occur when the RTP stream quality drops below or exceeds configured quality thresholds. The thresholds can be based on MOS scale, SWiQI index, jitter, latency, out of order packet events, packet loss events, packet duplication events and RTCP events. |
| 120 | Stream load balancing | An RTP stream may be signaled to move in order to achieve the desired load balancing results. |
| 130 | Admin move | The administrator may want to move specific RTP streams to a different WAN link. |
| 140 | Is remote stream? | Only RTP streams traversing a WAN link should be moved. Local RTP streams that stay only on the LAN should not be moved. |

-continued

Flow Chart Description

| Number | Brief Description | A More Detailed Description |
|---|---|---|
| 150 | Alternate path available? | RTP streams will only be moved when there is an alternate WAN link available for use. An ISP outage or poor quality scores on a WAN link may cause a particular link to be marked unavailable. |
| 160 | Select SIP server, Send Re-Invite, Update sequence number | Once a new WAN link has been selected, the SIP server is chosen to send a SIP INVITE request. The request will contain the IP address and TCP/UDP port information for the WAN link that the RTP stream will use. The SIP signaling sequence number must be maintained between the SIP device and the server. |
| 170 | Server accept request? | If the SIP server does not accept the request, then the RTP stream will not be moved and the session will continue as before. |
| 180 | Server challenge request? | The SIP server may challenge subsequent SIP INVITE requests on an active SIP session. |
| 190 | Send invite authentication | When the SIP server challenges the SIP INVITE request, the SIP INVITE must be re-sent with the proper authentication information. |
| 200 | Authentication successful? | If the authentication fails, then the RTP stream will not be moved and the session will continue as before. |
| 210 | Attempt move, Update sequence numbers | The dialog with the SIP server must be completed before the RTP stream can be moved. The state involving the SIP signaling sequence number (often referred to as the "cseq" value, must be maintained throughout the dialog. For a new "transaction" this number must monotonically increase; for a re-transmit of an old transaction, it must remain the same. |
| 220 | Move successful? | Did the dialog with the SIP server to move the RTP stream complete successfully? |
| 230 | Do not change | The RTP stream will not be moved and the session will continue as before. |
| 240 | Update stream | Move the RTP stream to the designated WAN link. |

An Embodiment of the Invention

An embodiment of the invention that we have built is described here; what follows is an example of a non-mobile-domain use of multiple WAN links. We will describe a QoS voice/video gateway which includes all steps of the method described in FIG. 4. It has been tested and verified for the economical and highly desirable deployment scenario depicted in FIG. 9, where no server side SBC is needed.

With reference to FIG. 9, the multi-link QoS gateway 910 has 3 logical network interfaces 961, 962 and 963. In this example 3 routers on the user local area network 990 connect the user to the public Internet 940—these routers are 921, 922 and 923. Network interfaces 961, 962 and 963 correspond to globally routable public IP addresses belonging to the 3 access Internet Service Providers shown in FIG. 9 as 931, 932 and 933 respectively. If any of these access Internet links are DSL or cable modem networks, then it is possible for the elements shown as 921, 922 and 923 to be DSL or cable modems, instead of IP routers in the traditional sense; the methods are still applicable as practitioners will be familiar with protocols such as DHCP [10] and PPPoE [11], which are used by the gateway to obtain dynamic public IP addresses in these cases.

In FIG. 9 a SIP user endpoint 990 is shown communicating with a SIP/RTP server 950; while this is a voice example, with 990 being a SIP phone and the server being an IP PBX, practitioners of ordinary skill in the art can also use it for video-based embodiments, as long as the methods for handling SIP and RTP in FIGS. 4 and 5 are adhered to.

In this embodiment, 3 alternate paths for quality of service in the non-mobile-domain are shown:
Path 1: 900, 910, 961, 921, 931, 940, 950
Path 2: 900, 910, 962, 922, 932, 940, 950
Path 3: 900, 910, 963, 923, 933, 940, 950

The gateway 910 described here appears to the routers 921, 922 and 923 as a transparent bridge; other embodiments could include the gateway actually appearing as a router, or incorporating one or all of the routers 921, 922 and 923. An embodiment of the invention 1010—whereby the WAN router modules 1021, 1022, 1023 are incorporated into the QOS gateway—is shown in FIG. 12.

Various algorithms for detecting failures and degrades, as well as relative improvements in quality between links over time can be implemented (110 in FIG. 4). For example, in one embodiment, the RTP stream in both directions is sampled at their natural arrival rate—which is once per 20 milliseconds in most VoIP cases where no loss occurs. By applying statistical techniques over a small number of sampling intervals (any value from 4-20 intervals is good) it is possible to detect changes in various quality conditions within 80 ms-200 ms. While this is one embodiment, those of ordinary skill in the art will recognize that step 110 can have a multiplicity of embodiments which need not be described here. Suffice it to say that the detect algorithm needs to be fast—so fast that auto-detect and auto-correct in the case of bad quality can be performed in under 2 seconds. We have built embodiments that perform this in under 1 second. In a multi link QoS context, fast detect is important because if more than a few seconds transpire and a voice or video call becomes unusable, the human users tend to give up and the call is considered "broken."

Those of ordinary skill in the art will also recognize that embodiments are capable of deciding, while a SIP/RTP session is in progress, that a stream needs to be moved for load balancing reasons as depicted in FIG. 4 as step 120. For example there may be 2 phones that are currently active as depicted in FIG. 10 as 900 and 901.

Initially the paths are as follows:
Stream 1 Phone 900: 900, 910, 961, 921, 931, 940, 950
Stream 2 Phone 901: 901, 910, 961, 921, 931, 940, 950

In other words, initially both streams use essentially the same WAN path represented by access ISP 1. Suppose a large PC file transfer gets triggered on the same path represented by ISP 1, which the gateway becomes aware of, and the gateway now decides to preemptively optimize for VoIP quality by moving Stream 2 to a better path, and suppose this better path is ISP 3; this can be done without breaking the RTP call that is already in progress.

Steps 140, 150, 160, 170, 180, 190, 200, 210, 220 and 240 can now be executed to move the stream "at will."

The final paths after the move are:
Stream 1 Phone 900: 900, 910, 961, 921, 931, 940, 950
Stream 2 Phone 901: 901, 910, 963, 923, 933, 940, 950

Most importantly, the call does not break during the move of the stream.

Those of ordinary skill in the art will also recognize another embodiment is possible where for administrative reasons, a stream may be moved while a session 100 is in progress. For example, it may be known in advance that the path represented by ISP 1 is going to be "taken down for service maintenance" in 20 minutes. Admin commands to move both streams depicted in FIG. 10—from path (961, 921, 931, 940, 950) to path (962, 922, 932, 940, 950) for example, can also be implemented in this invention, following the same steps in FIG. 4.

Those of ordinary skill in the art will also recognize that embodiments with multiple SIP server registrations are possible concurrently with an intermediate VoIP or video gateway 910; this is shown in FIG. 11. In these cases, the Select SIP Server step is needed as part of Step 160 in FIG. 4. For a call not to break, the SIP re-invite message of Step 160 needs to be sent to the same SIP server that handled the original SIP Invite for the call.

Those of ordinary skill in the art will recognize that the transport layer port and IP address parameters for the "move" can be conveyed in appropriately formulated SIP/SDP headers in the re-invite message, see step 160 in FIG. 4. In addition the "cseq" field requires proper handling, as described in the Flow Chart Description table above.

Another Embodiment of the Invention

Mobile Domain

Another example of where the invention may be applied is in cell phone roaming (or any other mobile device that uses cellular technology and faces problems of calls dropping when handoff occurs from one base station to another). The invention prevents dropped calls during hand off in an all-IP type network. If in addition, the following 2 conditions are met, then calls will not drop when roaming. These conditions are (a) the cell phone uses VoIP protocols SIP and RTP over IP, and (b) the cell phone always communicates with the same SIP server—that it originally registered with, for the entire duration of one call (630 in FIG. 6) as it moved from the first base station (605 in FIG. 6) to a second base station (606 in FIG. 6). As long as all these conditions are met, an embodiment of the invention in the cell phone will produce no dropped calls during handoff.

Those of ordinary skill in the art of cellular and VoIP technology will recognize that the embodiments are not limited to cell phones, but to all mobile devices that use SIP, RTP and IP protocols.

We claim:

1. A method of enhancing the reliability of a transmission from a source to a destination in a communications network using a network protocol that operates on top of the Internet Protocol (IP), the method comprising:
    transmitting data between a source and destination over a first network path made up of one or more network links where at least one of the network links is to a local area network that is remote from the transmission source; and
    switching the transmission from the first network path to one of a plurality of alternative network paths;
        wherein said transmission is not disrupted as a result of said switch to the one of a plurality of alternative network paths, said transmission contains audio or video data and at least one Network Address Translation (NAT) is performed on said transmission;
        said transmission uses the Real Time Protocol (RTP);
        said transmission uses the Session Initiation Protocol (SIP); and
        the SIP signaling sequence of the transmission is maintained after said switching from the first network path to the one of a plurality of alternative network paths.

2. The method of claim 1 wherein the switch from the first network path to the one of a plurality of alternative network paths occurs as a result of a stream quality event.

3. The method of claim 1 wherein the switch from the first network path to the one of a plurality of alternative network paths occurs as a result of stream load balancing.

4. The method of claim 1 wherein the switch from the first network path to the one of a plurality of alternative network paths occurs as a result of an administrator move.

5. The method of claim 1 wherein a SIP server associated with the one of a plurality alternative network paths may authenticate the transmission before it is switched.

6. The method of claim 1 wherein the source device is a mobile device.

7. The method of claim 6 wherein one or more of said plurality of alternative network paths become available to the mobile device during roaming.

8. A communications network comprising:
    a transmitting device;
    a receiving device;
    a first network device;
    a second network device;
    the transmitting device and receiving device operable to maintain a data transmission over a first network path that is made up of one or more network links where at least one of the network links is to a local area network is remote from the transmitting device;
        wherein the first network device is operable to switch the transmission from the first network path to one of a plurality of alternative network paths without disrupting the transmission; the second network device is operable to perform a Network Address Translation (NAT) on said transmission;
        said transmission contains audio or video content;
        said transmission is made using the Real Time Protocol (RTP);
        said transmission uses the Session Initiation Protocol (SIP); and said transmission's SIP signaling sequence is maintained after said switching from the first network path to the one of a plurality of alternative network paths.

9. The system of claim 8 wherein said switching from the first network path to the one of a plurality of alternative network paths occurs as a result of a stream quality event.

10. The system of claim 8 wherein said switching from the first network path to the one of a plurality of alternative network paths occurs as a result of stream load balancing.

11. The system of claim 8 wherein said switching from the first network path to the one of a plurality of alternative network paths occurs as a result of an administrator move.

12. The system of claim 8 wherein the SIP server associated with the one of a plurality alternative network paths may authenticate the transmission before it is switched.

13. The system of claim 8 wherein the transmitting device is a mobile device.

14. The system of claim 13 wherein one or more of said plurality of alternative network paths become available to the mobile device during roaming.

15. A method of enhancing the reliability of a transmission from a source to a destination in a communications network using a network protocol that operates on top of the Internet Protocol (IP), the method comprising:
  transmitting data between a source and destination over a first network path made up of one or more network links where at least one of the network links is to a local area network that is remote from the transmission source;
  switching the transmission from the first network path to one of a plurality of alternative network paths;
    wherein said transmission is not disrupted as a result of said switch to the one of a plurality of alternative network paths, said transmission contains audio or video data, and at least one Port Address Translation (PAT) is performed on said transmission;
    said transmission contains audio or video content;
    said transmission contains data used in the control of the audio or video transmission;
    said transmission uses the Real Time Protocol (RTP);
    said transmission further uses the Session Initiation Protocol (SIP); and
    the SIP signaling sequence of the transmission is maintained after said switching from the first network path to the one of a plurality of alternative network paths.

16. The method of claim 15 wherein the switch from the first network path to the one of a plurality of alternative network paths occurs as a result of a stream quality event.

17. The method of claim 15 wherein the switch from the first network path to the one of a plurality of alternative network paths occurs as a result of stream load balancing.

18. The method of claim 15 wherein the switch from the first network path to the one of a plurality of alternative network paths occurs as a result of an administrator move.

19. The method of claim 15 wherein a SIP server associated with the one of a plurality alternative network paths may authenticate the transmission before it is switched.

20. The method of claim 15 wherein the source device is a mobile device.

21. The method of claim 20 wherein one or more of said plurality of alternative network paths become available to the mobile device during roaming.

22. A communications network comprising
  a transmitting device;
  a receiving device;
  a first network device;
  a second network device;
  the transmitting device and receiving device operable to maintain a data transmission over a first network path that is made up of one or more network links where at least one of the network links is to a local area network is remote from the transmitting device;
  wherein the first network device is operable to switch the transmission from the first network path to one of a plurality of alternative network paths without disrupting the transmission; and said the second network device is operable to perform a Port Address Translation (PAT) on said transmission;
  said transmission contains audio or video content
  said transmission is made using the Real Time Protocol (RTP)
  said transmission further uses the Session Initiation Protocol (SIP); and
  said transmission's SIP signaling sequence is maintained after said switching from the first network path to the one of a plurality of alternative network paths.

23. The system of claim 22 wherein said switching from the first network path to the one of a plurality of alternative network paths occurs as a result of a stream quality event.

24. The system of claim 22 wherein said switching from the first network path to the one of a plurality of alternative network paths occurs as a result of stream load balancing.

25. The system of claim 22 wherein said switching from the first network path to the one of a plurality of alternative network paths occurs as a result of an administrator move.

26. The system of claim 22 wherein a SIP server associated with the one of a plurality alternative network paths may authenticate the transmission before it is switched.

27. The system of claim 22 wherein the transmitting device is a mobile device.

28. The system of claim 27 wherein one or more of said plurality of alternative network paths become available to the mobile device during roaming.

* * * * *